United States Patent

Walker

[15] 3,666,663

[45] May 30, 1972

[54] METHOD AND APPARATUS FOR DISPERSING COAGULANT INTO A WATER STREAM

[72] Inventor: James Donald Walker, Aurora, Ill.
[73] Assignee: Chicago Bridge & Iron Company
[22] Filed: Nov. 24, 1969
[21] Appl. No.: 879,410

[52] U.S. Cl..............................210/49, 210/206, 259/7
[51] Int. Cl.......................................................B01d 21/01
[58] Field of Search............259/4, 7; 210/42, 59, 49, 198, 210/206; 137/1

[56] References Cited

UNITED STATES PATENTS

| | | | |
|---|---|---|---|
| 1,362,611 | 12/1920 | Ellms | 210/49 |
| 3,470,091 | 9/1969 | Budd et al | 210/199 X |

Primary Examiner—Michael Rogers
Attorney—Darbo, Robertson & Vandenburgh

[57] ABSTRACT

A chemical additive is thoroughly and almost instantaneously mixed with huge quantities of water flowing through a large pipe or flume by dividing the additive into equal smaller streams, and feeding the chemical additive streams separately but at equal rates to a plurality of points equally distributed along the cross-section of the flow and vigorously churning the combined stream at a point just downstream from this feeding of the chemical solution. The churning is preferably by opposed propellers. Two propellers on a shaft, or on each of a plurality of shafts, each impel the water in the direction toward the other. As the water leaves the churn zone, it passes between stilling vanes parallel to the general direction of flow. Flow through the unit is preferably sufficiently constricted to increase flow turbulence and to prevent bypassing of water not fully blended, but the system nevertheless avoids excessive head loss.

9 Claims, 9 Drawing Figures

Patented May 30, 1972 3,666,663
2 Sheets-Sheet 1
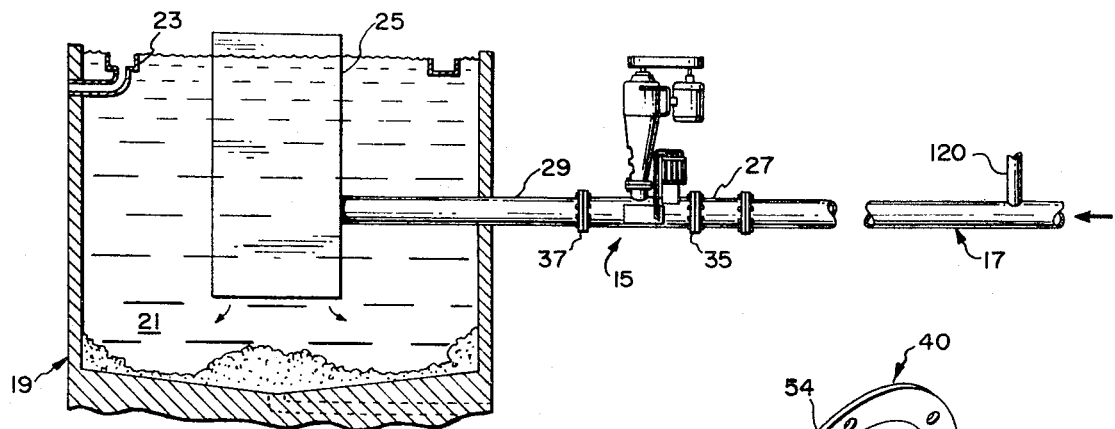
FIG. 1
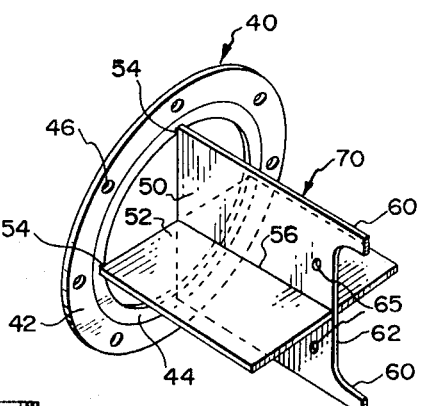
FIG. 3
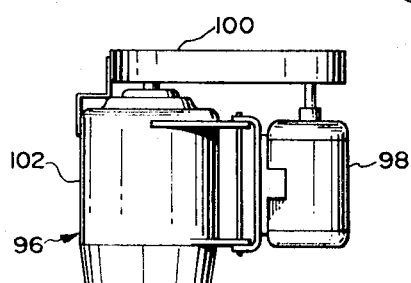
FIG. 2
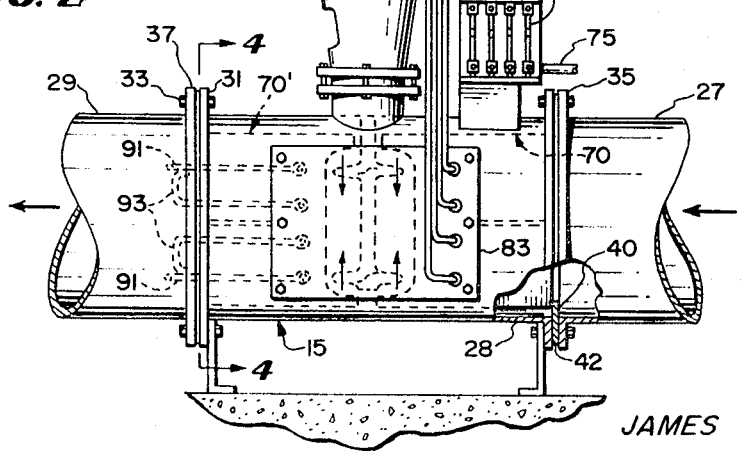
INVENTOR
JAMES DONALD WALKER
By Darbo, Robertson & Vandenburgh
Attorneys Patented May 30, 1972 3,666,663
2 Sheets-Sheet 2
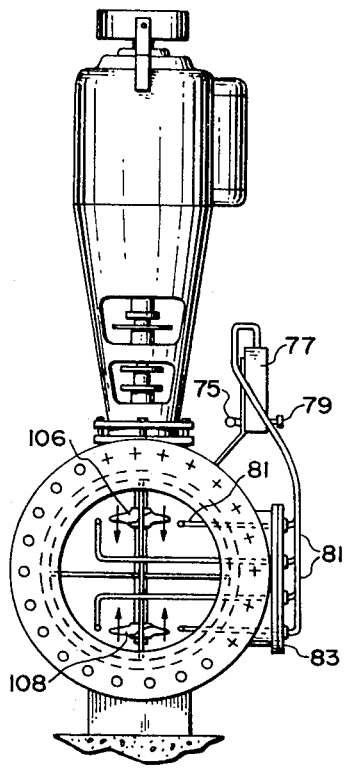
FIG. 4
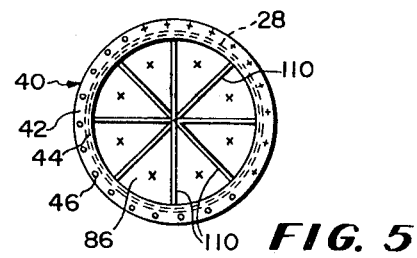
FIG. 5
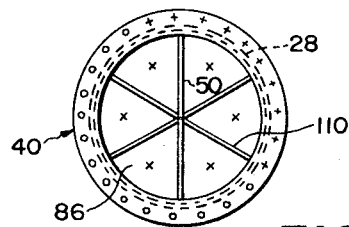
FIG. 6
FIG. 7
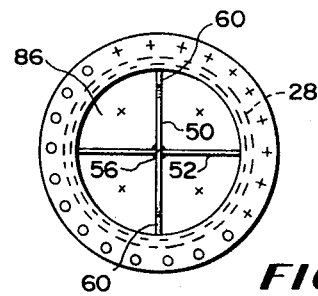
FIG. 8
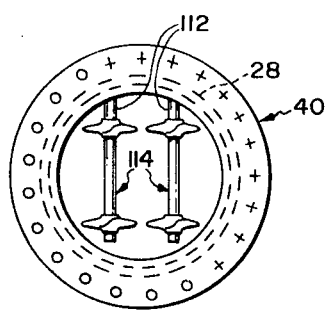
FIG. 9
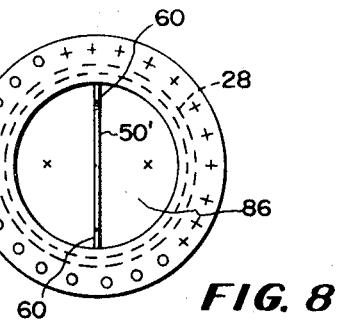
INVENTOR
JAMES DONALD WALKER

METHOD AND APPARATUS FOR DISPERSING COAGULANT INTO A WATER STREAM

BACKGROUND OF THE INVENTION

This invention provides an advance in the art of instantaneously dispersing additives throughout huge quantities of water flowing through a pipe or flume. It can be used, for example, to disperse coagulant solutions and thus, it is particularly useful in preparing water for filtration inasmuch as unfilterable colloids are occluded within large, insoluble, inert coagulant aggregates which either settle out or are filterable. In recent years it has been reported that variations in design or operation of equipment for mixing treatment chemicals in water cause a greater effect on filtered water quality than do variables in the final filtration process itself. Moreover, it has become appreciated that in order to achieve the theoretical ultimate in efficiency or effectiveness of a coagulant such as conventional aluminum or iron coagulants, the dispersal of the coagulant chemical solution throughout the water to be treated must occur within a very short, critical time period, that is virtually instantly. According to the present understanding of the science of water treatment the dissolved coagulant is converted to a relatively inert, coagulated condition almost instantaneously upon being dispersed; and, colloidal particles which are not reached by the coagulant during the instant of dispersion of the coagulant throughout the huge amount of raw water may not be subsequently picked up by the coagulant in the flocculation zone where only aggregate growth takes place. Frequently, in some plant operations, some colloidal particles remain uncoagulated because of less than adequate dispersion of the coagulant chemical solution at the instant of dispersion of that solution into the raw water. In some plant operations, due to inefficient dispersion of the coagulant solution, excessive quantities of coagulant are routinely added in an often times futile attempt to overcome the lack of dispersion efficiency. With water quality standards becoming more and more stringent, and the cost of treatment chemicals rising, the efficiency and fidelity of the coagulant blending phase is of prime importance in quality water production.

Numerous blending methods and apparatus have been suggested for dispersing coagulants into raw water in preparation of the water for filtration or other clarification. However, in addition to the difficulty encountered in achieving immediate uniform distribution of coagulant throughout the raw water stream, the equipment and methods available prior to this invention incurred large head loss, generally speaking. Early efforts utilizing a series of baffles in a channel proved very inefficient for rapid blending in spite of having high head loss. This method was followed by mechanical rapid mixing units, installed in basins with two to five minute retention periods. These units were presumed to be efficient and have been popular for many years. However, in fact, these basins failed to achieve complete blending of the coagulant with raw water within the critical time period. For example, the so called rapid-mix basins were too large to blend instantaneously, under through-put conditions, the coagulant feed with every portion of the water. They were found to be prone to drastic "short circuiting," some of the water finding a path from inlet to outlet that escaped the mixing action.

One of the objects of this invention is to provide a method and device for almost instantaneously dispersing coagulants through every portion of large quantities of in-stream water, with a minimum head loss. It is an object of this invention to provide a device for constantly blending a coagulant throughout each increment of flowing raw water in milliseconds.

SUMMARY OF THE INVENTION

Minuscule quantities of additive solution are almost instantaneously distributed throughout every incremental portion of a huge water stream flowing through a large pipe or flume by dividing the additive into a plurality of carefully metered smaller streams, passing the individual added streams into the larger water stream at a plurality of points in the cross-section of the large stream, in a zone in which the entire water stream is subjected to turbulence as it passes the point of injection.

DESIGNATION OF THE FIGURES

FIG. 1 is a schematic elevational view illustrating a utilization of the improvement of this invention in a water treatment system.

FIG. 2 is an enlarged partially cross-sectional elevational view.

FIG. 3 is a perspective view of a disc-vane assembly used in the embodiment of FIGS. 1 and 2.

FIG. 4 is an elevational view taken approximately along the line 4—4 of FIG. 2.

FIGS. 5 through 8 are views taken approximately as in FIG. 4, and illustrate alternative designs for vane-systems which can be used in accordance with this invention.

FIG. 9 is a view approximately as in FIG. 3 illustrating the use of a plurality of agitators.

DESCRIPTION OF PREFERRED EMBODIMENTS

Mixing station 15, improved in accordance with this invention, is incorporated into raw water feed line 17. Mixing station effluent proceeds to a clarifier, 19, diagrammatically shown, which includes relatively wide diameter basin 21, overflow troughs 23 and gentle-agitation section 25. From the clarifier overflow 23, the water proceeds to filtration stations (not shown) in other conventional processing stations.

Raw water line, 17, includes coupling section 27, pipe 28 of mixing station 15, and clarifier input line 29. Pipe 28 of mixing station 15 is secured to sections 27, and 29 by conventional butting joint flanges 31, secured by customary nuts and bolts 33. However, interposed between opposing flanges 31 at both upstream joint 35, and downstream joint 37, are baffle discs 40, each having peripheral section 42, in-line baffle section 44 and spaced openings 46 in peripheral section 42 for passage of bolts therethrough. In the embodiments illustrated in FIGS. 2, 3, 4 and 7, vertical vane 50 and horizontal vanes 52 are secured to baffle section 44 by welds 54. Horizontal vanes 52 are also secured to vertical vane 50 by welds 56. Vertical vanes 50 include extensions or projections 60 extending from end 62 of vane 50 which is most distant from disc 40. Openings 65 are provided in vertical vanes 50 to permit passage therethrough of additive secondary feedlines which will be described in detail hereinafter. In the illustrated embodiment two identical disc-vane assemblies 70 are utilized, one at upstream joint 35, with vanes 50, 52 extending downstream, the other at downstream joint 37 with its respective vanes 50, 52 extending upstream.

Additive Injection System

Main additive feedline 75, for example, a line connected to a source of coagulant-chemical solution in a water treatment plant, is connected to a plurality of valved flow meters 77. The flow through each flow meter 77 is accurately regulatable by its respective valve 79. Branch additive lines 81 pass from respective flow meters 77 through access plate 83 to the interior of pipe 28. Access plate 83 is sealed around secondary feedlines 81. Each of branch feedlines 81 ends in a respective section 86 of the interior of pipe 28 formed by vanes 50, 52, preferably discharging its stream of additive near the centroid of the cross section of its respective section, as perhaps best seen in FIG. 4. Each $x$ shown in sections 86 in FIGS. 5 through 8 indicates the preferred approximate point of injection in each of the illustrated configurations.

Sections 86 are defined as that fractional portion of the cross-sectioned area of the stream pipe or flume, represented by the total cross-sectional area divided by the number of branch additive injection points. In the preferred embodiment, each section 86 is bounded by physical walls or dividers, e.g., vanes 50, 52, though the presence of the vanes is not absolutely essential. It is possible that the vanes can be omitted, provided that in some way, flow past, and in close proximity to, each additive injection point is made a consistent part of the whole, with sufficient equality between the flows to achieve the uniformity of distribution desired. It is important, however, that the chemical streams be injected at enough points distributed through the cross-section of flow, with an approach to equalizing of dosing rates, and with sufficient agitation immediately upon injection, to achieve instantaneous mixing throughout the entire mainstream.

Flow meters 27 are preferably of the conventional type in which an indicator rises in a tapered tube, its height increasing as the flow increases. With the indicators all at the same level, the equality of flow usually desired is achieved. If any constructional features or other factors might induce less flow in some sections 86, than others, an operator can experiment and see if the rate of injection to that section can be reduced without impairing the ultimate results. The equality of dosing rate desired is that which will amount to the same percentage of coagulant to the water flowing through each section 86.

Power Mixer

Power mixer, generally 96, includes motor means 93, transmission means such as pulley system 100, gear box 102, shaft 104, upper propeller 106, and lower propeller 108. Propellers 106, 108, are pitched to propel water in opposite directions, preferably toward each other, as indicated in FIGS. 2 and 4. It is noted that extensions 60 of vanes 50, parallel to the general direction of flow of liquid passing through pipe 28, are located axially with respect to the axis of rotation of the impellers, and serve as rotation spoilers. Although they act directly on the water approaching the impellers axially, they reduce the rotation of the entire body of water surrounding each shaft.

Alternative Constructions

Disc-vane assembly 70 can be modified, depending on the size of pipe 28 and the quantity of water into which the additive is to be dispersed, to include a larger, or smaller, number of sections 86. Each section would have a branch additive feedline 81. Thus, as illustrated in FIGS. 5 and 6 vanes 110 may be used in a variety of angular spacings. In a relatively small pipe 28, one vane 50 will suffice, as illustrated in FIG. 8. If shaft 40 should be horizontal, it would also be horizontal. It is essential, in accordance with this invention, that a branch additive feedline 81 inject a proportional portion of additive in each of the sections 86.

As illustrated in FIG. 9 a plurality of mixers 112 on shafts 114 may be positioned along a plane perpendicular to the general direction of flow through pipe 28, and this arrangement is particularly preferred in embodiments in which pipe 28 is of relatively large diameter. Rotation spoilers 60 should be provided for each shaft, as close to the plane as convenient. Separate pieces may be welded in place if no vane 110 is reasonably near the plane.

Operation

Raw water, or other liquid through which a relatively small quantity of additive is to be dispersed, passes through feedline 17 in the direction indicated by the horizontal arrows of FIGS. 1 and 2. Upstream baffle 40 causes considerable turbulence immediately downstream thereof in the region between upstream and downstream end of mixing station 15. It and vanes following it also tend to ensure equal flow through the various sections 86. A main stream of additive, passing through main feedline 75 is split into a plurality of branch streams, in the embodiment of FIGS. 2 through 4, into four streams, and the relative quantity of additive liquid passing in each of the branch streams is operator-controlled using conventional flow meters 77 such as rotameters to provide substantially equal secondary streams passing through respective branch additive lines 81. Thus, material passing through lines 81 and being discharged into sections 86 are discharged into a violently turbulent region within mixing station 15. When power mixer 96 is in operation, fluid is drawn from outer zones of pipe 28 and driven inward, axially of shaft 40. This vigorous agitation complements the mixing action of upstream baffle 40. At relatively low rates of flow, i.e., at rates of flow well below the design limit for the particular pipe 28, turbulence generated downstream of upstream baffle 40, is insufficient for the desired quick and complete dispersal of additive throughout the mass of liquid passing through each of sections 86. During these relatively low flows mixer 96 nevertheless provides virtually instantaneous homogenization, i.e., homogeneous dispersion of the additive solution throughout the water passing through pipe 28. Thus, within a fraction of a second, perhaps even within a few microseconds, depending on the rate of flow through feedline 17, the additive solution is completely dispersed throughout each increment of fluid passing through mixing station 15.

Additional additive feedlines 81 and stream sampling lines 93 may be added through access plate 83 as suggested at the phantom lines in FIG. 2. Lines 91, 93, however, terminate downstream of downstream baffle 40, and hence can be used for sampling, or can be used to discharge a supplementary additive, e.g., alkaline agents, solid carbon in a slurry, polyelectrolytes, etc. into the main stream outside of the "mixing station" 15. Turbulence in the downstream region generated by downstream baffle 40 continues the homogenization or thorough mixing of the stream well past mixing station 15. Also, upstream line 120 can be used to add ph modifiers, or other modifiers as required by the chemistry of the particular raw water stream.

Reports on actual tests in water treatment plant indicate that using the preferred embodiment illustrated in FIGS. 1, 2, and 4 herein, the quality of water passing from a final filter of a water treatment plant was improved by the use of the illustrated embodiment, even though substantially 20 percent less coagulant chemicals than before were required. Also, in the same test, head loss of less than 1 foot was reportedly encountered through mixing station 15. This may be compared to a mixing station of the prior art which had reportedly been tried at this point, but not successfully used because its head loss was prohibitive, about 12, feet.

The improved quality of the water with less coagulant appears to result from the quick uniform dispersal of the coagulant. Samples taken at sample lines 93 during operation of the embodiment illustrated in FIGS. 1, 2, and 4, showed the complete equalization of the concentration in each section, of an additive added through branch lines 81. As indicated above, operation of mixing station 15, in accordance with this invention, at relatively low flows through pipe 28, i.e., at flows well below the maximum design capacity, does not provide sufficient turbulence or churning within station 15 due to the action of upstream baffle 40 alone. When mixing station 15 is operated under these relatively low flow conditions, therefore, use of power mixer 96 is essential.

It should be noted that in the design and construction of municipal water treatment plants, for example, it is considered good engineering practice to provide for substantial expansion of operating capacity for the increases normally encountered in a foreseeable future. Thus it is considered good practice, by many engineers, to design and build a water treatment plant capable of handling present requirements as relatively low flow, and which is capable of handling a substantially increased flow. Using the embodiment of this invention illustrated in FIGS. 1, 2, and 4 herein, power mixer 96 is preferably used in the early years of operation of the water treatment plant in which the flows are well below design capacity. It should be noted however that as the flow through pipe 28 approaches the design capacity, sufficient turbulence may exist within section 28 of the illustrated embodiment to instantaneously and completely homogenize and mix additives throughout the stream, even with power mixer 96 not in operation.

However, in general, it is preferred that power mixer 96 be operated even at relatively high rates of flow at which power mixer 96 might be unnecessary, to better assure complete, instantaneous dispersion of coagulant through the water to be treated. Nonetheless, an operator wishing to economize even at some risk can stop power mixer 96 or, if practical, incrementally diminish its speed, while mixing station 15 is carrying a full or heavy flow, and observe the quality of the water leaving final filtration. This, of course, is the final and most important test of the efficacy of the coagulant-mixing operation taking place at station 15 and this, of course, is the best test by which an operator of a specific unit, processing a specific raw water can determine whether continued operation of power mixer 96 is required at any specific high flow condition. If the quality remains undiminished, it is apparent that the multipoint injection at a point of flow-induced turbulence is a sufficient use of the present invention. However, even such an economical operator should test further to see if with the mixer 96 in operation and see if the amount of coagulant can be reduced enough to offset the cost of power for mixer 96.

Thus, in accordance with this invention, virtually instantaneous mixing of additive, for example, chemical coagulants in water treatment streams is provided, with the result that decreased levels of additive have been found to be sufficient to provide improved water quality, and with the result that head losses encountered using the invention are vastly and astoundingly less than the head loss encountered in using the prior art rapid mixers. To illustrate the use of the mixer of this invention, addition of coagulant chemicals to raw water has been discussed in detail. This invention is not limited to such use, however, and is generally useful wherever relatively small amounts of one liquid must be dispersed throughout a relatively large volume of a second liquid. This invention is especially important when very quick dispersal is required, but represents an economy in the amount of mixing energy required, even when speed is not important.

I claim:

1. Apparatus for dispersing coagulant solution into a raw water stream flowing through a conduit comprising:
   means for dividing a stream of additive into a plurality of secondary additive streams;
   means for regulating and measuring the flow in each of said secondary additive streams;
   means for conveying and injecting each of said secondary additive streams into said raw water stream each at a respective discharge point in said raw water stream, said discharge points being spaced apart throughout the raw water stream; and
   annular constriction means located upstream of said discharge points for generating turbulence in said raw water stream, said discharge points being positioned in the zone of said turbulence.

2. An apparatus for instantaneously mixing a relatively small additive stream throughout a relatively large fluid stream comprising:
   means for dividing the primary additive stream into a plurality of secondary additive streams;
   means for regulating the flow in each of said secondary additive streams;
   means for measuring the rate of flow in each of said secondary additive streams;
   means for conveying and injecting each of said secondary additive streams into said large fluid stream at respective injection points, said respective injection points being widely spaced apart from each other;
   constriction means extending into said large fluid stream whereby a zone of turbulence is generated adjacent to and downstream of said constriction means, said injection points being positioned in said zone of turbulence; and
   power mixing means comprising a pair of propellers on a shaft, motor means for rotating said shaft, said propellers being pitched to move fluid in said stream in opposite directions, said shaft being positioned perpendicular to the general direction of flow of the stream, said mixing means being located downstream of, and adjacent to said injection points.

3. An apparatus as in claim 2 in which the large stream is divided into a plurality of substantially equal sections by a first set of vanes adjacent to and downstream of said constriction means, each of said injection points being positioned within a respective section, approximately at the centroid of its respective section.

4. An apparatus as in claim 3 including a second set of vanes dividing said stream into a plurality of sections, said set being fixed to the wall of the fluid stream conduit and being positioned adjacent to and downstream of said power mixing means.

5. In a mixing station including means for mixing a stream of raw water, means for injecting a primary additive stream into the raw water stream, the improvement in which the mixing station includes:
   a plurality of segments of pipe butted end to end and joined by externally fastened opposing joint flanges;
   an annular disc having an opening therethrough, and a planar portion sized for positioning between said opposing flanges and for providing an extending portion extending into the raw water stream;
   means for splitting said primary additive stream into a plurality of secondary additive streams;
   control means for measuring and controlling the flow rate through said secondary additive streams;
   means for conveying and discharging said secondary additive streams into said raw water stream at a plurality of respective injection points;
   a first set of vanes fixed to said extending portion and separating the large stream into a plurality of smaller streams therebetween, each of said respective injection points being positioned in a respective section near the centroid thereof;
   mixing means comprising a pair of propellers fixed to a shaft, means for rotating said shaft, said propellers being pitched to urge fluid in the conduit in opposite directions, said shaft being positioned substantially perpendicular to the direction of flow of the fluid, said propellers being positioned adjacent opposite walls of said conduit.

6. In a mixing station as in claim 5 which includes a second annular disc having an opening therein, said second disc being positioned between the opposing joint flanges which are downstream with respect to said mixing station, said second annular disc having projecting portions extending into the stream;
   a second set of vanes for dividing said stream into a plurality of sections, said second set being fixed to said projecting portions of said second disc and extending upstream with respect to said second disc.

7. A method of achieving uniform and substantially instantaneous dispersion of a coagulant of a type most efficiently used by substantially instant dispersion, including the steps of:
   flowing a large stream of liquid to be treated through a conduit;
   injecting a coagulant of said type, divided into several separate streams of predetermined flow rations, into said large stream near centroids of cross-sectional sectors of the large stream having corresponding flow ratios; and
   providing turbulence in the large stream for distributing the coagulant through it, said turbulence including turbulence of the cross-sectional sectors of the large stream at positions to begin the mixing of the coagulant therein substantially instantly upon injection of the coagulant; and including a zone of vigorous turbulence with major flow induced by propulsion means moving transversely throughout the large stream in a zone positioned to mix the coagulant throughout the large stream promptly after injection, with vigorous flow from at least one transversely acting impeller passing through and intermixing a plurality of sectors.

8. Apparatus for achieving uniform and substantially instantaneous dispersion of a coagulant including:
- a conduit through which flows a large stream of liquid to be treated;
- means for injecting a coagulant, divided into several separate streams of predetermined flow ratios, into said large stream near centroids of cross-sectional sectors of the large stream having corresponding flow ratios; and
- means for providing turbulence of the cross-sectional sectors of the large stream at positions to begin the mixing of the coagulant therein substantially instantly upon injection of the coagulant;
- said apparatus including propulsion means for providing vigorous turbulence in a zone positioned to mix the coagulant throughout the large stream promptly after injection by causing flow transversely throughout the large stream, with vigorous flow from at least one transversely acting impeller passing through and intermixing a plurality of said sectors.

9. A method of achieving uniform and substantially instantaneous dispersion of a coagulant of a type most efficiently used by substantially instant thorough dispersion, including the steps of:
- flowing a large stream of liquid to be treated through a conduit;
- injecting a coagulant of said type, divided into several separate streams of predetermined flow ratios, into said large stream near centroids of cross-sectional sectors of the large stream having corresponding flow ratios; and
- providing turbulence in the large stream for distributing the coagulant through it, said turbulence including turbulence of the cross-sectional sectors of the large stream at positions to begin the mixing of the coagulant therein substantially instantly upon injection of the coagulant; and including not later than immediately after injection a zone of vigorous turbulence with flow moving the coagulant at least throughout substantially the entire cross section of each sector of the stream by movements transversely of the main direction of stream flow and transversely of each other to mix the coagulant with good uniformity throughout the large stream promptly after injection.

* * * * *